Feb. 13, 1951     C. E. STRONG     2,541,125

RADIO NAVIGATION SYSTEM

Filed Nov. 13, 1947     3 Sheets-Sheet 3

INVENTOR
CHARLES E. STRONG
BY   *R. P. Morris*
ATTORNEY

Patented Feb. 13, 1951

2,541,125

UNITED STATES PATENT OFFICE 2,541,125

RADIO NAVIGATION SYSTEM

Charles Eric Strong, London, England, assignor to International Standard Electric Corporation, New York, N. Y., a corporation of Delaware Application November 13, 1947, Serial No. 785,630 In Great Britain October 2, 1946

Section 1, Public Law 690, August 8, 1946 Patent expires October 2, 1966

18 Claims. (Cl. 343—112)

This invention relates to radio navigation systems of the kind in which a fixed beacon station radiates omni-directionally signals of such a character that a mobile station receiving the said signals may derive navigational information therefrom. More particularly, the invention relates to systems of the kind mentioned in which the beacon transmits over different channels signals indicative of different kinds of information, the said channels being operative on a multiplex or time-sharing basis.

While such navigation systems are of value in connection with all kinds of mobile craft, they are of special value in connection with aircraft navigation, particularly in the vicinity of airports where it is desirable that navigational information such as, for example, information as to the bearing and distance of the craft from a specific location marked by a beacon, and landing or other airport control instructions, be made available in the plane with a minimum of apparatus-adjustment by the pilot and preferably on a continuous basis.

The simultaneous provision of a number of different kinds of information can of course be accomplished by transmitting each particular kind of information on a separate wavelength.

Such an arrangement however has the drawback that it involves in the aircraft a corresponding number of radio receivers which have to be individually tuned and/or maintained, while at the beacon station there is a corresponding number of radio transmitters all requiring individual attention. Moreover, in a region of dense traffic involving a number of beacon stations within comparatively short distance of one another it may be difficult to secure a sufficient number of wavelengths to avoid interference between the various radio services. It is therefore highly desirable that all services from a given beacon should be carried on the same wavelength, preferably on a multi-channel basis so as to give simultaneous presentation of the different kinds of information.

Multi-channel communication systems already known to the art can be grouped in two main classes, carrier systems and multiplex systems. In carrier systems each channel has a characteristic frequency corresponding to a continuous sub-carrier wave which is modulated by the information to be transmitted, all the modulated sub-carriers being applied to modulate the main or radiation-frequency carrier. In multiplex systems all the channels use the same carrier frequency but are discontinuous in time, the energy of a channel taking the form of a series of pulses a parameter of which is modulated by the information to be transmitted, the pulses of the several channels being interleaved in a predetermined sequence. At the receiving end of such a system the incoming pulses are applied to a gating system, synchronised with the transmitter which routes the various pulses to their respective channel demodulations, to yield the informations by which the corresponding transmitter channels are modulated. While various types of pulse modulation are known, that usually referred to as "time modulation" lends itself particularly well to beacon work, as explained hereinafter; in this type of modulation, the pulses are of fixed amplitude duration, and mean repetition frequency, but are advanced or retarded in time according to the amplitude and sign of the modulating signal.

There has been described in the specification of South African Patent 1,354/45, dated August 15, 1947, a radio beacon system in which each of the antennae comprised in a circular array is commutatively connected to an energising source in cyclical succession, whereby the field set up at a distant point consists of a succession of pulses of high frequency energy, the phase of the radio energy in each pulse varying with the distance i. e. with the time of propagation between the said point and the antenna from which the energy has been radiated, and the field received from the array over a cycle of commutation is in effect a wave which is phase modulated at the frequency of commutation the phase of this modulation depending on the bearing of the distant point relation to the array. By extracting this phase modulation and comparing the phase thereof with that of a reference wave of the same frequency the bearing may be determined. It is to be observed that in this case the bearing information is ultimately derived from the phase of the high frequency radiated wave, and not from the phase or timing of the received antenna pulses. Nevertheless the timing of each pulse, i. e. of the envelope of the high frequency wave, is also affected by the propagation time, and the pulses obtainable at the distant point by amplitude demodulation of the received high frequency wave may be regarded as being time-modulated at the frequency of commutation, and when demodulated in a suitable pulse receiver system they yield a wave of commutation frequency the phase of which varies with the bearing of the point of reception relative to the array.

It is therefore a principal object of the present invention to provide a radio navigation system in which directional information is derived by time-demodulation of transmitted pulses.

A further object of the present invention is to provide a radio navigation system in which different navigational information including a directional information are transmitted over different channels of a pulse time-sharing multiplex system the transmitting and receiving terminals whereof are located respectively at a beacon station and at a mobile station.

According to the invention there is provided a radio navigation system comprising at a beacon station an array of at least three antennae equally spaced round the circumference of a circle, an antenna located at the centre of said circle, means for transmitting as a bearing signal consecutive equi-spaced pulses of energy from consecutive antennae of said array in regular progression, means for transmitting from said central antenna as a reference signal a series of pulses of energy so relatively timed and interleaved in correspondence with said equi-spaced pulses of energy as to be cyclically varied in relative timing in substantially the same manner as the pulses of energy receivable from said antenna array at a distant point in a particular direction, and means for transmitting from said central antenna synchronising pulses of energy of distinctive pulse characteristic. The said equi-spaced pulses of energy, said series of pulses of energy transmitted from said central antenna, and said synchronising pulses of energy may constitute three channels of a time-sharing multiplex pulse transmission system.

The invention further provides a radio navigation system as described in the preceding paragraph, further comprising means for transmitting from said central antenna one or more other series of energy pulses, each said other series of pulses constituting an additional channel of said time-sharing multiplex transmission system, and means for time-modulating said additional channels with different respective informations, such as the beacon call sign, traffic messages, or ranging tone received at the beacon from a mobile station for retransmission for distance-measuring purposes.

The invention still further provides a radio navigation system comprising in a mobile station means for observing energy from a radio beacon as described in the preceding-but-one paragraph, means for demodulating said received energy to yield interleaved trains of pulses corresponding respectively to said bearing-signal to said reference-signal, and to said synchronising pulses of energy of distinctive characteristic, means responsive to said synchronising pulse trains for separating out said bearing-signal pulse trains and said reference-signal pulse trains, means for extracting the time-modulation of the pulses of each of said separated-out trains to yield a bearing-signal wave and a reference-signal wave of the same relatively low frequency, and means for comparing the phases of said low frequency waves, the result of said phase comparison yielding the azimuth bearing of said mobile station relative to said beacon.

Navigation systems in accordance with the invention are relatively free from site and reflection perturbations, firstly by virtue of the use of a comparatively large number of spaced antennae giving an effect of "space diversity," and secondly by virtue of the use of pulse-time modulation which is essentially a wide-band constant amplitude method of modulation giving an effect of "frequency diversion."

The invention will be better understood from a study of the following description of one embodiment of the invention, illustrated by the accompanying drawings, in which.

Figure 1:
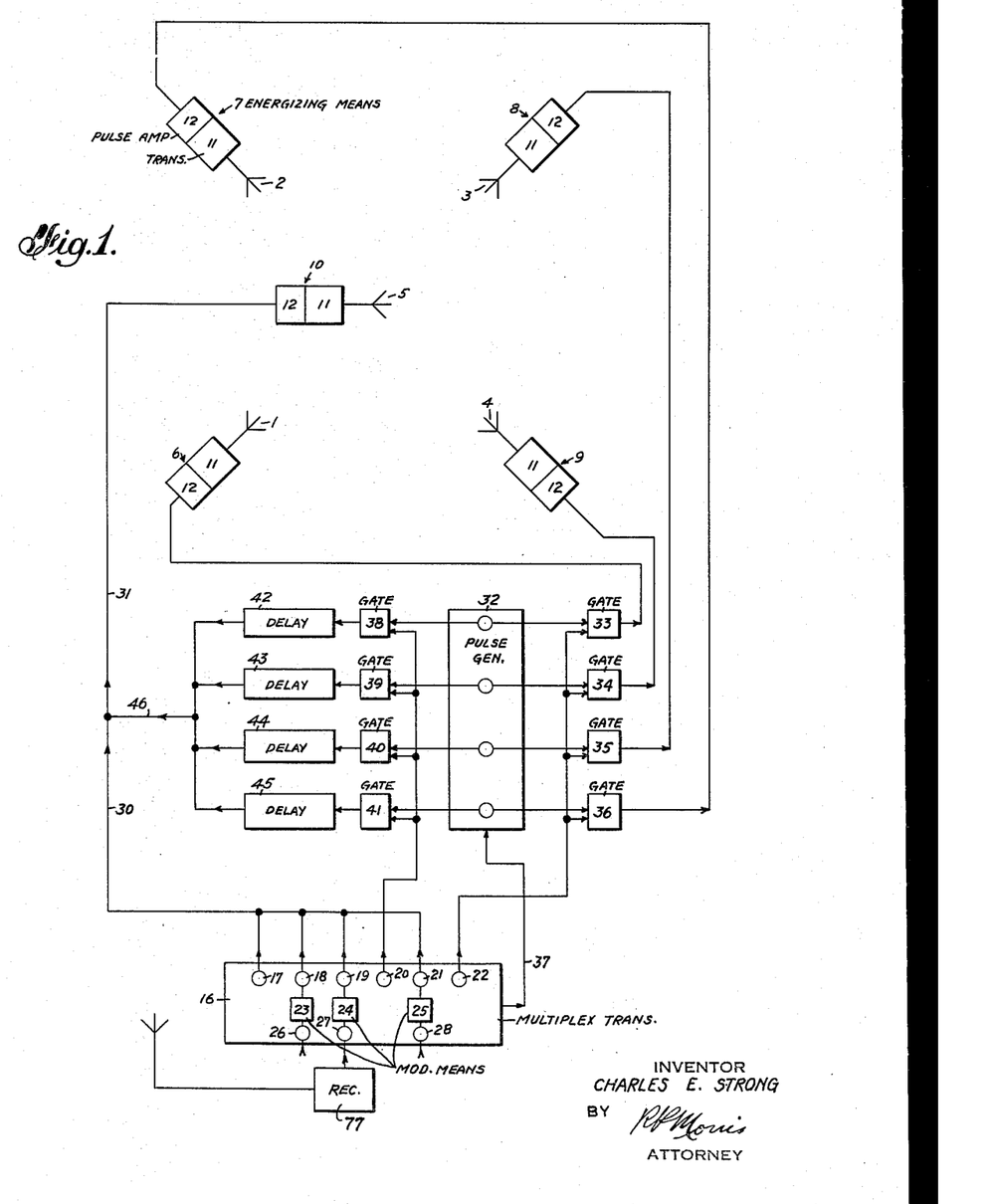
Fig. 1 is a block diagram illustrating a radio beacon station in accordance with the invention.

Referring now to Fig. 1, this illustrates a beacon station forming part of a radio navigational system in accordance with the invention. In this particular embodiment the antenna system comprises an array of four antennae 1, 2, 3, 4 equally spaced round the circumference of a circle of diameter 600 metres, together with another antenna 5 located at the centre of the circle. All these antennae are of omnidirectional type. Associated with each antenna is an energising means as indicated by references 6, 7, 8, 9, 10. Each of said energising means comprises a radio transmitter 11, which is normally blocked, and pulse amplifier means 12 the output of which unblocks the transmitter 11 throughout the duration of the amplified pulse, whereby the antenna radiates pulses of high frequency energy corresponding to the pulses incoming to its associated pulse amplifier. The radio transmitters 11 may for example be of self excited pattern, in accordance with well understood technique, with anode energy supplied by the associated pulse amplifier. All the radio transmitters should oscillate at substantially the same high frequency, so as to minimise the bandwidth used by the system, but synchronism is not essential, since no use is made of the phase of the radiated high frequency wave. If so desired the radio transmitters instead of being individually self-excited may be excited from a common source. It is to be understood however that such excitation from a common source is not essential to the successful operation of the invention, and that where such common excitation, or synchronisation with a reference source, is considered desirable, any available technique may be applied without any modification being imposed by requirements of the present invention, so long as the energisation of the antenna is controlled by the pulses applied to the energising means.

Figure 2:
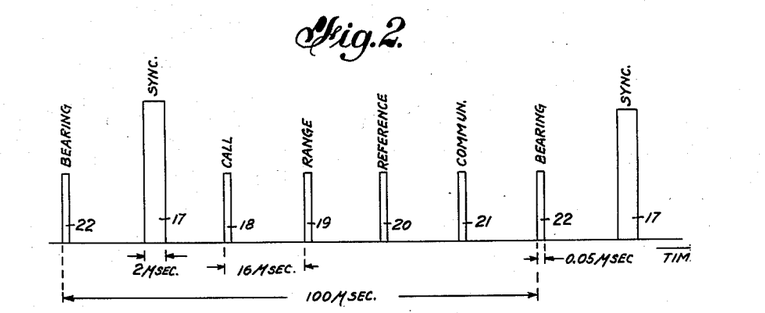
Fig. 2 is a diagram referred to in explanation of the operation of the arrangement shown in Fig. 1.

Still referring to Fig. 1, reference 16 denotes a time-sharing multiplex pulse transmitter arranged for six channels the outputs of which are delivered respectively at terminal points 17, 18 . . . 22 in that order of time-sequence. In each of the channels the pulses have a repetition frequency of 10 kc./s., repetition period 100 microseconds while the channel period i. e. the interval between two pulses adjacent in time, irrespective of their occurrence in different channels, is one-sixth of the channel repetition period, i. e. approximately 16 microseconds. These time-relationships are illustrated in Fig. 2, which shows seven consecutive pulses from multiplex transmitter 16 identified by the terminal points at which they appear in Fig. 1. The pulses delivered at terminal point 17 are synchronising pulses and have a duration period of 2 microseconds, while the pulses delivered at terminal points 18, 19 ... 22 have each a duration period of 0.5 microsecond. Associated with terminal points 18, 19 and 21 are respective modulating means 23, 24 and 25 whereby the pulses delivered at these terminal points may be time-modulated through a range of ±2 microseconds by low frequency information signals applied at terminal points 26, 27 and 28. More particularly, at terminal point 26 is applied information from a source not shown consisting of the station call-sign repeated at regular intervals; at terminal point 27 is applied information obtained from receiver 77 and consisting of a low frequency ranging tone received from a mobile station desirous of determining its distance from the beacon; while at terminal point 28 is applied information consisting of traffic signals, for example landing instructions from a source not shown.

The pulses delivered at terminal points 20 and 22 are not modulated in transmitter 16.

The multiplex 6 channel transmitter 16 may be of any construction adapted to yield and to time-modulate where necessary pulses repetition period, duration period, and channel period as described in the preceding paragraph. Various such constructions are already known in the pulse-communication art, and it is therefore considered unnecessary to describe the multiplex transmitter in detail in the present specification. A suitable type of construction to which reference may be made by way of example, is that described in the specification of Indian Patent 33,575, dated February 4, 1948.

The synchronising pulses delivered at terminal point 17 and the time-modulated pulses delivered at terminal points 18, 19 and 21 are fed together over lines 30 and 31 to control the energisation of central antenna 5 through the pulse amplifier 12 and radio transmitter 11 of energising means 10. As illustrated in Fig. 2, the synchronising pulses may be greater in amplitude than the pulses of any of the other channels, since satisfactory operation of the receiving system described hereinafter, is wholly dependent on the efficacy of the synchronism of the receiving equipment with the transmitting equipment, and it is therefore desirable that the synchronising signal should have a good signal-to-noise ratio at all times.

The unmodulated equi-spaced pulses supplied by multiplex transmitter 16 at terminal point 22 are fed through a distributer-controlled gating system to the antennae of the circular array in such fashion that consecutive pulses energise consecutive antennae in regular progression round the array and thereby set up a "bearing signal" as explained hereinafter. The distributer and gating system comprises a four-phase pulse generator 32, and gating devices 33, 34, 35 and 36, there being one phase and one gating device per antenna of the array. Pulse generator 32 delivers pulses of repetition period equal to the product of the said channel repetition period multiplied by the number of antennae in the array, which product in the present instance is 400 microseconds, and of duration less than the channel repetition period but greater than the duration period of the pulses delivered at terminal point 22 i. e. less than 100 microseconds and more than 0.5 microsecond between these limits, the value is not critical, and in the present instance it has been made equal to approximately 5 microseconds.

Each gating device receives pulses from a corresponding phase of pulse 32 and also from terminal point 22, the timing of pulse generator 32 being such that each of the pulses supplied from terminal point 22 is fully overlapped by one or other of the phase-pulses from 32 and is thereby enabled to pass the corresponding gating device. To ensure satisfactory timing of the gating pulses the pulse generator 32 is electrically locked with the multiplex transmitter 16 over line 37.

The unmodulated pulses supplied by multiplex transmitter 16 at terminal point 20 are fed through a distributer-controlled gating system to the central antenna energising means 10, there being associated with the gating system means for timing the pulses in such fashion that the energy received at a distance in any direction varies in the same manner as the energy received from the antenna array in a predetermined direction i. e. the pulses applied from terminal point 20 to the central antenna set up an omnidirectional "reference signal."

The distributer and gating system is similar to that used for the pulses fed to the antenna array, and in fact in the present instance, the form-phase pulse generator 32 is common to both the gating system, the pulses of respective phases being applied to the corresponding gating devices 38, 39, 40, 41 together with pulses from terminal point 20 which are applied to all the gating devices simultaneously. Associated with the gating devices 38 to 41 are delay means 42, 43, 44, 45 each comprising a delay line or artificial line which delays the pulses passed by the gating device by a predetermined amount as hereinafter described. The outputs from the delay means 42 ... 45 are fed in common over lines 46 and 31 to control the energising means 10 associated with centre antenna 5 in the same manner as the pulses from terminal points 17, 18, 19 and 21.

Figure 3:
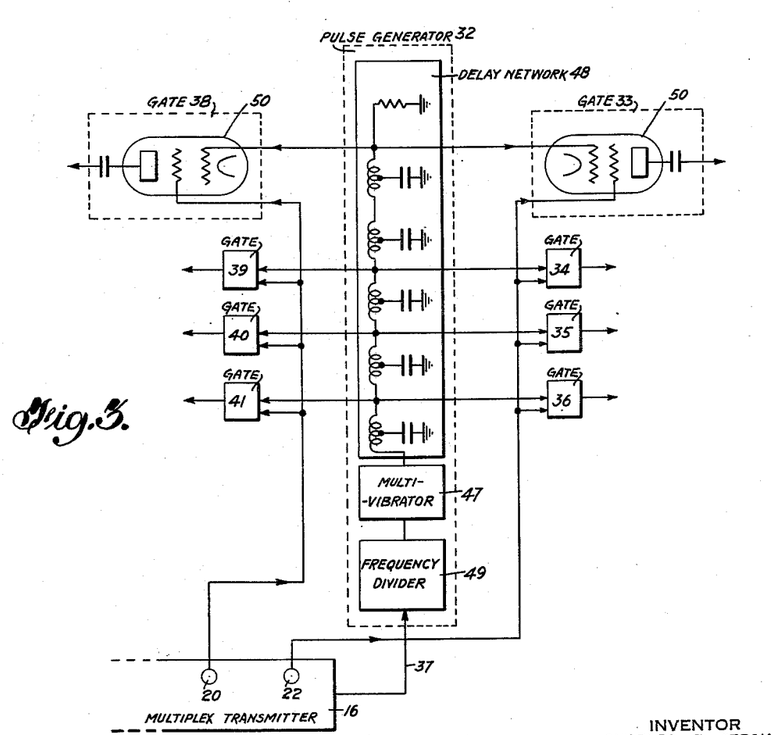
Fig. 3 is a drawing illustrating in greater detail part of the arrangement shown in Fig. 1.

Fig. 3 illustrates certain details of the distributer and gating systems shown in Fig. 1. The four-phase pulse generator 32 comprises a multivibrator 47 which delivers pulses of repetition period 400 microseconds and duration period approximately 5 microseconds, to a delay network such as artificial line 48 built up in the usual manner from a plurality of sections (not all of which are shown), each section comprises series inductance and shunt capacity, sufficient sections being used to enable the multivibrator pulses to be transmitted the whole length of the delay network without appreciable distortion. The delay network 48 is terminated by a resistance of value equal to the characteristic impedance of the network, so that no reflections are set up, and is of electrical length such as to have a total delay time of 400 microseconds. Phase terminals are provided by tapping the line at regular intervals corresponding to delays of 100 microseconds between adjacent tappings, these tappings providing pulses for the several gating devices at intervals of 100, 200, 300 and 400 microseconds respectively after the generation of each pulse by multivibrator 47. The operation of the latter is locked with that of multiplex transmitter 16 by means of frequency divider 49 which receives input over line 37 from the main source of pulses in multiplex transmitter 16 illustrated in part in Fig. 3.

The gating devices 33 ... 36, 38 ... 41 are all alike, and as illustrated in Fig. 3 for devices 33 and 38 each comprises a thermionic valve 50 having two control electrodes, one of which has applied to it the pulses to be gated, while the other has applied to it the pulses from the appropriate phase of pulse generator 32. The output of the gating valve is taken off at the anode through a blocking condenser. The supply circuits for cathode, anode and control grid bias have been omitted from the drawing as the use of valves for gating purposes is well known in the art.

It will of course be understood that polyphase generator 32 may be of any other construction known to the art provided that it supplies gating pulses of duration period and repetition period as specified. For example, it may comprise a chain of multivibrators which are so connected that each triggers its successor, and provides the pulses of its phase.

Figure 4:
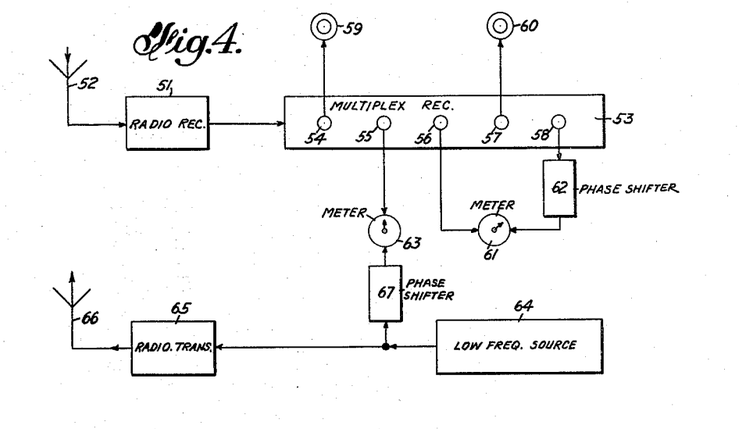
Fig. 4 is a block diagram illustrating a mobile station in accordance with the invention and adapted for association with the beacon station illustrated in Fig. 1.

Referring now to Fig. 4, this illustrates a mobile station forming part of a radio navigation system in accordance with the invention. At 51 is indicated a radio receiver which includes amplitude demodulation means and is responsive to energy picked up by an omnidirectional receiving antenna 52 from the beacon station illustrated in Fig. 1. The demodulated output from radio receiver 51 consists of trains of pulses corresponding to the pulses of the various channels of the multiplex transmitter 16 illustrated in Fig. 1, and these trains of pulses are fed to a pulse multiplex receiver 53 adapted to operate in correspondence with the said multiplex pulse transmitter. In this multiplex receiver the pulses of the different channels are separated out in time and routed under the control of the synchronizing pulses, to appropriate ones of five time-demodulating means the outputs of which appear respectively at terminal point 54, 55 . . . 58, these outputs corresponding to the effective modulations of the pulses delivered by transmitter 16, Fig. 1 at terminal points 18, 19 . . . 22. There is no output corresponding to the synchronising pulses delivered at terminal point 17, of Fig. 1, since the corresponding pulses fed from radio receiver 51 to multiplex pulse receiver 53 have no function to perform externally to the multiplex pulse receiver itself, but are solely utilised in controlling the operation of the said pulse receiver. Taking the output terminals in order from 54, to 58, the output at 54 corresponds to the call-sign modulation applied through modulator 23 (Fig. 1); the output at 55 corresponds to the ranging-signal modulation applied through modulator 24 (Fig. 1); the output at 56 corresponds to the reference-signal modulation arising from the distributer, gating, and delay network system hereinbefore described with reference to the pulses delivered to terminal point 20 (Fig. 1); the output at 57 corresponds to the traffic-signal modulation applied through modulator 25 (Fig. 1); and the output at 58 corresponds to the modulation of the pulses arising from the distribution in space of the array-antennæ which are consecutively energised under the control of consecutive pulses delivered at terminal point 22 (Fig. 1) as hereinbefore described.

The multiplex pulse receiver 53 of Fig. 4 may be of any construction adapted for co-operative association with the multiplex pulse transmitter 16 of Fig. 1. Various such constructions are already widely known in the art of pulse communication, and it is therefore considered unnecessary to include any details in the present specification. A suitable type of construction to which reference may be made by way of example is that described in the specification of previously mentioned Patent #33,575.

The outputs from terminals 54 and 57 i. e. the call-sign information and traffic signal information, are fed to suitable utilisation devices, for example head receivers, as indicated at 59 and 60 respectively. The outputs from terminals 56 and 58 i. e. the reference-signal and the bearing-signal, are fed to a phase comparison system comprising an indicator 61, such as a cathode ray oscillograph or a phase-meter, the reading of which gives an indication of the azimuth bearing of the mobile station relative to the beacon station. If desired a phase shifting device indicated by 62, of any well known type, may be inserted in series with one or other of the outputs to be phase compared, in order to adjust the datum point of the phase comparison systems either arbitrarily or to compensate for unwanted phase shifts occurring in one or other terminal of the navigation system. The output from terminal 55 i. e. the ranging tone, is fed to another phase comparison device 63 of any well known suitable type, in which it is phase-compared with a wave of like frequency derived from a low frequency source 64 which modulates a radio transmitter 65 the energy from which is radiated from omnidirectional antenna 66 and received by receiver 77 at the beacon station of Fig. 1 to supply the ranging tone used to modulate the pulses delivered at terminal point 19 shown on that figure, this phase comparison yielding the distance of the mobile craft from the beacon station in accordance with well-known distance-measuring technique.

As in the case of the azimuth-measuring circuits a phase shifting device 67 may be inserted in series with one or other of the feeds to phase comparison device 63 in order to compensate for unwanted phase shifts occurring in either terminal of the navigation system. The radio transmitter 65 may be of any convenient type known to the art, preferably operating on a wavelength different from that used by the beacon so as to avoid creating interference in radio receiver 51; and there is no restriction on the type of modulation, other than that it must correspond with the demodulation means used at the beacon station to derive the ranging tone which is to be repeated by the beacon over one of its channels. Transmitter 65 may indeed be the regular communication transmitter used by the mobile craft for sending messages of any description. If the mobile craft normally communicates over a multiplex system, one channel thereof may be assigned for the continuous transmission of ranging tone.

Considering now the operation of the system as a whole, it will be observed in effect it comprises a time-modulated pulse multiplex transmission system, having the pulse transmitter at the beacon station and the corresponding pulse receiver on the mobile craft connected by a radio link. Of the multiplex channels carrying information i. e. other than the channel allotted to the synchronising pulses, the call sign channel and the traffic signal or communication channel operate in accordance with the technique of time modulated pulse communication appropriate to the particular pulse equipment in use. The same applies to the "ranging signal" channel, over which is repeated a modulating tone transmitted by the mobile craft, which receives the repeated tone with a phase delay corresponding to the total time of propagation from craft to beacon and back again, and by measurement of this phase delay relative to the phase of modulation transmitted by the craft the distance between the craft and the beacon may be determined in accordance with well known radio altimeter or radio obstacle detection practice. In these three channels the call-sign channel, and the traffic signal channel and the ranging signal channel, the modulation is applied to the channels in the same manner as for a normal communication system. In the case of the remaining two channels—the bearing signal channel and the reference signal channel—the modulation is applied by means associated directly with the antenna system as will now be explained.

In the case of the bearing signal channel, consecutive and equi-spaced pulses of the channel are applied as already described in connection with Fig. 1 to energise consecutive antennae of the array in regular progression, so that the array emits a series of pulses of energy which are equi-spaced in time i. e. devoid of modulation. Since the antennæ of the array are distributed in space and the consecutive pulses are derived from common terminal point 22, care must be taken that the propagation times of the circuits from the said common point to each of the antenna of the array are equalised, so as to ensure equal spacing of the energy pulses at the antennæ. This equalisation is conveniently obtained by physical equalisation of the connections from terminal point 22 to each of the antennæ, but any unavoidable differences may be equalised by phase shifting means in either the pulse frequency or the radio frequency portions of the total connections.

Figure 5A:
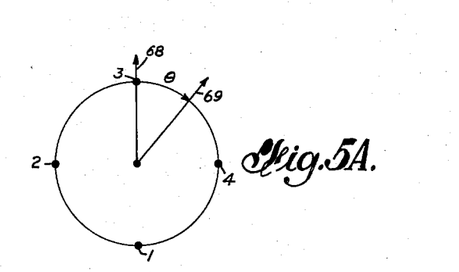
Figs. 5A and 5B are drawings referred to in explanation of the operation of the invention.

Referring now to Fig. 5A, references 1, 2, 3, and 4 indicate as before the respective antennæ of the circular array, while 5 indicates the central antenna. The pointer line 68 indicates a reference direction which for simplicity of explanation has been selected to lie parallel to the vertical plane containing opposing antennæ references 1 and 3. Pointer line 69 indicates a direction making an azimuth angle $\theta$ with the reference direction 68. It will be assumed that the antennæ of the array are energised consecutively in the order 1, 2, 3, 4, 1, 2 . . . i. e. clockwise round the array. At a distant point in the direction 69 the pulses of energy from the various antennæ of the array will not be equi-spaced, since the propagation times from the separate antennæ to the same point will in general be different. For example, if $\theta$ be taken as zero (direction 69 coinciding with reference direction 68), and if the time of arrival of the pulses from antenna 1 be taken as a time reference point, the pulses of energy received from antenna 3 will arrive in a time shorter than if they had been radiated from antenna 1 by the time corresponding to the reduction in path length by the spacing between antennæ 1 and 3; since these are oppositely arranged on a circle of diameter of, in the present instance, 600 metres, the pulses from antenna 3 will have a differential or relative time displacement of 2 microseconds. The paths from antennæ 2 and 4 being shorter than the path from antenna 1 by the radius of the circle, 300 metres, will similarly each result in a time differential displacement of 1 microsecond in respect of the arrival of pulses of energy from these antennæ as compared with the times of arrival which would have been obtained had the pulses been radiated from antenna 1. The corresponding output pulses from radio receiver 51 of Fig. 4 exhibit these same differential time displacements, which are interpreted by the channel demodulator as a time modulation recurrent at the repetition period of the four-phase distributory pulse generator 32 (Fig. 1), which in the present instance is 400 microseconds, frequency 2500 kc./s. The output of the channel demodulator, at terminal 58 of multiplex receiver 53 (Fig. 4) corresponds to the envelope of the time-modulation.

Figure 5B:
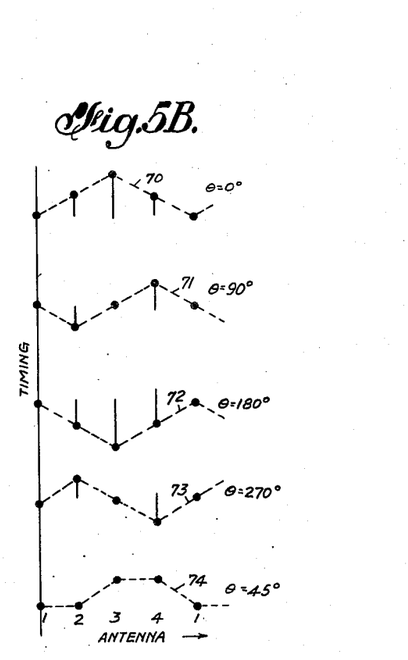

This is illustrated by dashed curve 70 of Fig. 5B joining the ends of the vertical lines the lengths of which represent the time displacements, or relative timings, of consecutive pulses from the array relative to the times which would be observed were all the pulses radiated from a single antenna.

In similar manner one arrives at the envelope curves 71, 72, 73 and 74 corresponding respectively to $\theta=90°$, $\theta=180°$, $\theta=270°$, and $\theta=45°$. It will be observed that the phase of these envelope curves, and hence of their fundamental frequency components, varies in progression with $\theta$.

The reference signal pulses of energy are, as previously mentioned, all radiated from the same, central, antenna. Whatever the direction of propagation, therefore, there is no differential path difference to effect an apparent time modulation of the transmitted pulses of energy.

A time-modulation is however imposed by delaying consecutive pulses by different amounts by means of the distributer controlled gating system and delay network system described in connection with Fig. 1. Since it has been assumed in connection with Fig. 5 that the array antenna are separated in order 1, 2, 3, 4, 1, with the connections shown on the drawing the reference signal gating devices will operate in the order 38, 41, 40, 39. By making the delay devices 42, 45, 44, and 43 such as to introduce respective differential time delays of 0.1 microsecond, 2 microseconds and 1 microsecond the pulses received over the reference signal channel of multiplex receiver 53 are made to have an envelope of time modulation simulating exactly that of the bearing signal pulses corresponding to the reference direction 68. Phase comparison between the demodulated outputs of the bearing signal channel at terminal 58 and the reference signal channel at terminal 56 will therefore yield the azimuth bearing of the mobile station relative to the beacon station, and for this purpose there is provided phase comparison system 61. This preferably includes means for selecting and phase comparing the fundamental frequency components of the two waves, the envelopes of which may have different wave forms; compare for example the envelopes corresponding to $\theta$ equal to any of the quadrant values of 0°, 90°, 180°, and 270° with the envelope corresponding to an intermediate value $\theta=45°$, as illustrated by the curves of Fig. 5B. As already mentioned the datum point of phase-comparison device 61 may be adjusted or corrected as desired by phase shifting means 62. As the number of antennæ in the array is increased the shapes of the envelopes of the bearing-signal and reference-signal time-modulations approach more and more closely to the sinusoidal for all values of $\theta$, and the utility of selecting the fundamental component of the demodulated output wave is correspondingly diminished.

The construction of the beacon station hereinbefore described with reference to Figs. 1 and 3 is perfectly general, and may be used for arrays comprising any number of antennae not less than three, and for any particular reference direction. If however the particular or reference direction is so chosen that, in a complete sequence of pulses of energy receivable from the array (one from each antenna of the array), at a distant point in the reference direction, certain ones of the receivable pulses constitute a number of pairs, the components of a pair being distinguished by having the same relative timing, the construction of the beacon station may be modified by omission of certain of the time-distributer gating valves and the respective time delay devices associated therewith.

For example, if the antenna array comprises an even number of antennae, then for any reference direction parallel to a vertical plane which bisects the angle subtended at the centre of the circle by two adjacent antennae of the array all the pulses of energy reservable at a distant point in the direction may be grouped in pairs the components of any one pair derived from two antennae symmetrically located on either side of the said vertical plane and therefore equidistant from the distant point. This may be illustrated by reference to Fig. 5A and Fig. 5B; for if the reference direction is taken not as that indicated by line 68 on Fig. 5A but as that indicated by line 69 with $\theta=45°$, i. e. in a vertical plane bisecting the angle subtended at the centre of the circle by adjacent antennae 3 and 4, curve 74 of Fig. 5B shows that a sequence of four pulses receivable in the new reference direction constitute two pairs arising, the one from antennae 1 and 2, and the other from antennae 3 and 4, each pair having its own distinguishing time interval. Referring back to Fig. 1, it will be observed that the central antenna reference signal pulses corresponding to the pulses controlling the energisations of antennae 1 and 2 are applied through delay devices 42 and 45; since the time delays in these two devices are now required to be equal, one of these two delay devices say 42 may be omitted, together with its associated gating valve 38, and the output phase of the 4 phase pulse generator 32 which was coupled to the gating valve 38 may now be coupled to gating valve 41, as illustrated by the line 75 shown in Fig. 1A so that the latter passes through delay device 45 pulses corresponding to the pulses controlling both of the antennae 1 and 2.

Figure 1A:
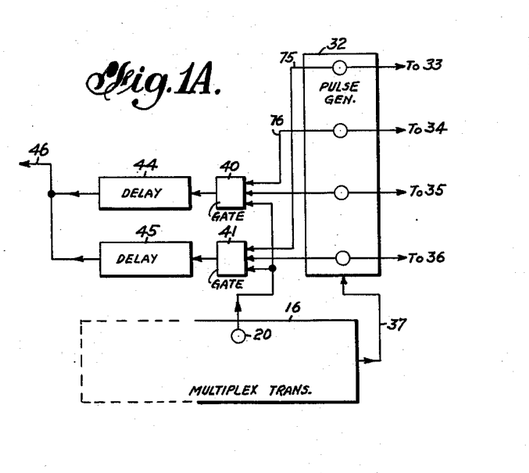
Fig. 1A is a block diagram illustrating a modification of a part of the arrangement shown in Fig. 1.

Similarly, since the time delays in devices 43 and 44, corresponding to the energisations of antennae 4 and 3, are now required to be equal, one of these two delay devices, say 43, may be omitted together with its gating valve 39, the output phase previously coupled to gating valve 39 being now coupled to gating valve 40, as illustrated by the line 76 shown in Fig. 1A.

Generalising the foregoing paragraph, in a system using an array of N antennae, when N is an even number not less than four, the beacon system of Fig. 1 may be modified to use only N/2 time-distributer gating valves each with an associated delay device, instead of N gating valve and N delay devices, on condition that the reference direction is parallel to a vertical plane bisecting the angle subtended at the centre of the circle by any two adjacent antennae of the array.

It will be evident that some pairing of the receivable pulses, with corresponding possible reduction in the number of delay devices and time-distributer gating valves, is also to be obtained if the reference direction is so chosen that it lies parallel to a vertical plane containing the centre of the array circle and one of the array antennae. If in this case the number of antennae in the array is N, then if N is an even number there will be $(N-2)/2$ pairs, while if N is odd there will be $(N-1)/2$ pairs, each pair reducing by one the number of time-distributor gating valves and associated delay devices required to time-modulate the reference signal pulses in similitude of the time modulation of the bearing signal pulses receivable in the reference direction.

While the hereinbefore described time-distributor and gating system for modulating the reference signal pulses which control the energisation of the central antenna is preferred as producing a reference signal of the same character as the bearing signal and therefore particularly suitable for comparison therewith, it is to be understood that there may be used any means for effecting the required modulation which will produce the desired result of yielding at the receiver a wave of reference phase. For example a signal of suitable phase and of the same low frequency as the fundamental component of the bearing signal yielded at the output of the multiplex receiver of the mobile station, may be applied to time modulate the pulses delivered at terminal point 20 of Fig. 1 in the same manner as the traffic signals incoming at terminal point 28 modulate the pulses delivered at terminal point 21 via time modulator 25, the pulses from terminal point 20 then being applied to energizing means 10 in the same manner as the pulses delivered at terminal points 17, 18, 19, and 21.

In the particular embodiment of the invention described with reference to Fig. 1 the diameter of the array has been chosen as 600 metres. It will be appreciated that the choice of diameter is governed not by the operating wavelength but by the amount of time modulation of the pulses. In the present instance the multiplex receiver is adapted to handle pulses which are time modulated up to 2 microseconds, which is the maximum difference in relative timing which can be obtained from the array, and occurs with pulses of energy radiated by two opposed antenna, i. e. 600 metres apart, in line with the direction of propagation. Using the same multiplex receiver the diameter of the array could be reduced, and the system would continue to be workable, but with a degradation of the signal-to-noise ratio at the receiver, since the bearing signal time-modulation would be decreased in proportion to the reduction in the diameter of the array.

The beacon station forming part of the invention is essentially an omni-directional beacon, and the antennae used therein could normally all be of the omni-directional type as described with reference to Fig. 1. If however the beacon is required to serve only a limited angle of azimuth arc, the various antennae may be given sufficient directivity to concentrate the beacon energy within said angle.

While in the embodiment of the invention described with reference to the accompanying drawings there has been provided only one traffic-signal or communication channel, it will be understood that more than one such channel may be provided if necessary. It will also be understood that any of these communication channels may be adapted for voice communication or for telegraph signalling, and that a voice-communication channel may be used either to carry speech signals or to carry the signals of a V. F. multi-channel telegraph system.

On referring to Fig. 2 it will be noted that in the described embodiment of the invention the bearing-signal and reference signal channels are not adjacent in time but are spaced apart by the communication channel. This is done in order to reduce the risk of cross-talk between the closely related bearing and reference channels. If cross-talk between adjacent channels is negligible the functions of different channels may be allotted without regard to their time-sequence in the multiplex equipment.

It has already been remarked that as the number of antennae in the array is increased the envelopes of the bearing and reference signal modulations approach more closely to sine waves. For the sake of simplicity the embodiment in the present specification has been restricted to an array of four antennae, with the result that the said envelopes, as illustrated in Fig. 5B, are far from sinusoidal. While such a four-antenna array gives quite a satisfactory performance, when high reliability of azimuth bearing is desired the number of antenna should be increased, and it is considered that in most cases the array should preferably consist of not less than say eight antennae. The envelope of modulation will then be built up from eight pulses per cycle, and cancellation or exaggeration of a single pulse by static or other interference will have little effect on the phase of the wave delivered by the channel demodulator, and hence little effect on the bearing indication.

What I claim is:

1. A radio navigation system comprising at a beacon station an array of at least three antennae equally spaced around the circumference of a circle, an antenna located at the centre of said circle, means for transmitting as a bearing-signal consecutive equi-spaced pulses of energy from consecutive antennae of said array in regular progression, means for transmitting from said central antenna as a reference-signal a series of pulses of energy so relatively timed and interleaved in correspondence with said equi-spaced pulses of energy as to be cyclically varied in relative timing in substantially the same manner as the pulses of energy receivable from said antenna array at a distant point in a particular direction, and means for transmitting from said central antenna synchronising pulses of energy of distinctive pulse characteristic.

2. A system according to claim 1, in which said equi-spaced pulses of energy, said series of pulses of energy transmitted from said central antenna, and said synchronising pulses of energy constitute three channels of a time-sharing multiplex pulse transmission system.

3. A radio navigation system comprising at a beacon station an array of at least three antennae equally spaced round the circumference of a circle, an antenna located at the centre of said circle, means for transmitting as a bearing-signal consecutive equi-spaced pulses of energy from consecutive antennae of said array in regular progression, means for transmitting from said central antenna as a reference-signal a series of pulses of energy so relatively timed and interleaved in correspondence with said equi-spaced pulses of energy as to be cyclically varied in relative timing in substantially the same manner as the pulses of energy receivable from said antenna array at a distant point in a particular direction, and means for transmitting from said central antenna synchronizing pulses of energy of distinctive pulse characteristic, means for transmitting from said central antenna one or more other series of energy pulses, each said other series of pulses constituting an additional channel of said time-sharing multiplex pulsed transmission system, and means for time-modulating said additional channels or channels with different respective informations.

4. A system according to claim 3 in which one of said additional channels is modulated in accordance with the beacon call-sign.

5. A system according to claim 3 in which one of said additional channels is modulated in accordance with traffic messages.

6. A system according to claim 3 in which one of said additional channels is modulated by a ranging tone derived from a signal received at the beacon from a mobile station.

7. A system according to claim 3 in which said synchronising channel pulses are characterised by having a duration period different from that of the pulses in any other of said channels.

8. A system according to claim 7 in which the duration period of said synchronising channel pulses is greater than that of the pulses in any other of said channels.

9. A radio navigation system comprising at a beacon station an array of at least three antennae equally spaced round the circumference of a circle, an antenna located at the centre of said circle, means for transmitting as a bearing-signal consecutive antennae of said array in regular progression, means for transmitting from said control antenna as a reference-signal a series of pulses of energy so relatively timed and interleaved in correspondence with said equi-spaced pulses of energy as to be cyclically varied in relative timing in substantially the same manner as the pulses of energy receivable from said antenna array at a distant point in a particular direction, and means for transmitting from said central antenna synchronizing pulses of energy of distinctive pulse characteristic, means for transmitting from said central antenna one or more other series of energy pulses, each said other series of pulses constituting an additional channel of said time-sharing multiplex pulsed transmission system, and means for time-modulating said additional channels or channels with different respective informations, a time-sharing multiplex pulse transmitter, antenna-energizing means individual to said central antenna and to each antenna of said array, said energizing means being responsive to pulse originated in said multiplex pulse transmitter, bearing-signal means for applying consecutive pulses of a first channel of said transmitter to control the energization of consecutive antennae of said array in regular progression around the array, whereby the relative timing of the pulses of energy receivable from said array at a distant point is cyclically varied with the phase of the cyclicity related to the direction of said point, reference-signal means including pulse-timing means for applying pulses of a second channel of said transmitter to control the energization of said central antenna in such fashion that the relative timing of the pulses of energy receivable from said central antenna at said distant point is cyclically varied in substantially the same manner as the pulses of energy receivable from said array in a particluar reference direction, and means for applying pulses of other channels of said transmitter to control the energization of said central antenna, the pulses of one of said other channels being said synchronizing pulses.

10. A system according to claim 9 in which each said antenna energising means comprises a normally blocked source of high frequency oscillations, means for unblocking said sources in response to pulses from said multiplex transmitter, and means for applying the output of said source to energise said associated antenna.

11. A system according to claim 9 in which said antenna array comprises N antennae, and in which the said bearing-signal means for applying consecutive pulses of said first channel comprises an antenna-distributor N-phase pulse generator locked with said multiplex transmitter and having a pulse repetition period equal to N times the channel repetition period of said multiplex transmitter and pulse duration period not greater than said channel repetition period and not less than the pulse duration period of said first channel pulses, a plurality of N antenna-distributor gating valves each having two control electrodes, means for applying the pulses of said first channel to one control electrode of each said antenna-distributor gating valve, and means coupling the other control electrode of each antenna-distributor gating valve to a respective predetermined output phase of said antenna-distributor N-phase pulse generator, and means for applying the outputs of said antenna-distributor gating valves to control the energisation of respective antennae of said array.

12. A system according to claim 9 in which said antenna array comprises N antennae, and in which the said reference-signal means including pulse-timing means for applying pulses of a second channel comprises a time-distributor N-phase pulse generator locked with said multiplex receiver and having a pulse repetition period equal to N times the channel repetition period of said multiplex transmitter and pulse duration not greater than said channel repetition period and not less than the pulse duration of said second channel pulses, a plurality of N time-distributor gating valves each having two control electrodes, means for applying the pulses of said second channel to one control electrode of each said time-distributor gating valve, means coupling the other control electrode of each said time-distributor gating valve, to a respective predetermined output phase of said time-distributor N-phase pulse generator, and means for applying the outputs of said time-distributor gating valves each through a respective time delay device to control the energisation of said central antenna.

13. A system according to claim 12, in which said particular or reference direction is such that in a sequence of N pulses of energy receivable from said array at a distant point in said reference direction certain ones of said receivable pulses constitute a number of pairs, the components of a said pair being distinguished by having the same relative timing, said system being modified in that for each of said pairs the said plurality of N time-distributor gating valves and their respective associated output delay devices is reduced by one, the output phase of said N-phase time-distributor pulse generator which would otherwise be left free by said reduction being coupled to the said other control electrode of a predetermined one of the remaining time-distributor gating valves.

14. A system according to claim 13, in which said antenna-distributor N-phase pulse generator serves also as said time-distributor N-phase pulse generator and delivers pulses, the duration period of which is sufficiently long to include one pulse of each of said first and second channels.

15. A radio navigation system comprising in a mobile station means for receiving energy from a radio beacon according to claim 1, means for demodulating said received energy to yield interleaved trains of pulses corresponding respectively to said bearing-signal to said reference-signal and to said synchronising pulses of energy of distinctive characteristic, means responsive to said synchronising pulse trains for separating out said bearing-signal pulse trains and said reference-signal pulse trains, means for extracting the time-modulation of the pulses of each of said separated-out trains to yield a bearing-signal wave and a reference-signal wave of the same relatively low frequency, and means for comparing the phases of said low frequency waves, the result of said phase comparison yielding the azimuth bearing of said mobile station relative to said beacon.

16. A system according to claim 15, in which said interleaved trains of pulses are applied to the input of a multiplex pulse receiver to energise respective channels thereof, said multiplex receiver comprising means for time-demodulation of the pulses in all channels except that occupied by the synchronising pulses, and in which said low frequency waves are yielded at the outputs of respective channels.

17. A radio navigation system comprising in a mobile station means for receiving high frequency energy from a radio beacon according to claim 9, means for demodulating said received energy a pulse multiplex receiver adapted for co-operative association with said pulse multiplex transmitter, means for applying said demodulated high frequency energy to the input of said pulse multiplex receiver, means for deriving from the separate channel outputs of said multiplex receiver low frequency waves corresponding respectively to each of said different informations and to said bearing signal and to said reference signal, and means for comparing the phases of said low frequency bearing signal wave and said low frequency reference signal wave, the result of said phase comparison yielding the azimuth bearing of said mobile station relative to said beacon.

18. A system according to claim 17, further comprising means in said mobile station for transmitting a modulating tone to be retransmitted from said beacon station as one of said informations, and means for comparing the phases of said transmitted modulating tone and the corresponding derived from a channel of said multiplex receiver, the result of said phase comparison yielding the range or distance between said mobile station and said beacon.

CHARLES ERIC STRONG.

REFERENCES CITED

The following references are of record in the file of this patent:

UNITED STATES PATENTS

| Number | Name | Date |
|---|---|---|
| 2,406,468 | Loughlin | Aug. 27, 1946 |
| 2,411,518 | Busignies | Nov. 26, 1946 |

FOREIGN PATENTS

| Number | Country | Date |
|---|---|---|
| 577,795 | Great Britain | May 31, 1946 |